C. J. ALPAUGH.
CONDUIT.
APPLICATION FILED JULY 29, 1913.
1,094,109.
Patented Apr. 21, 1914.
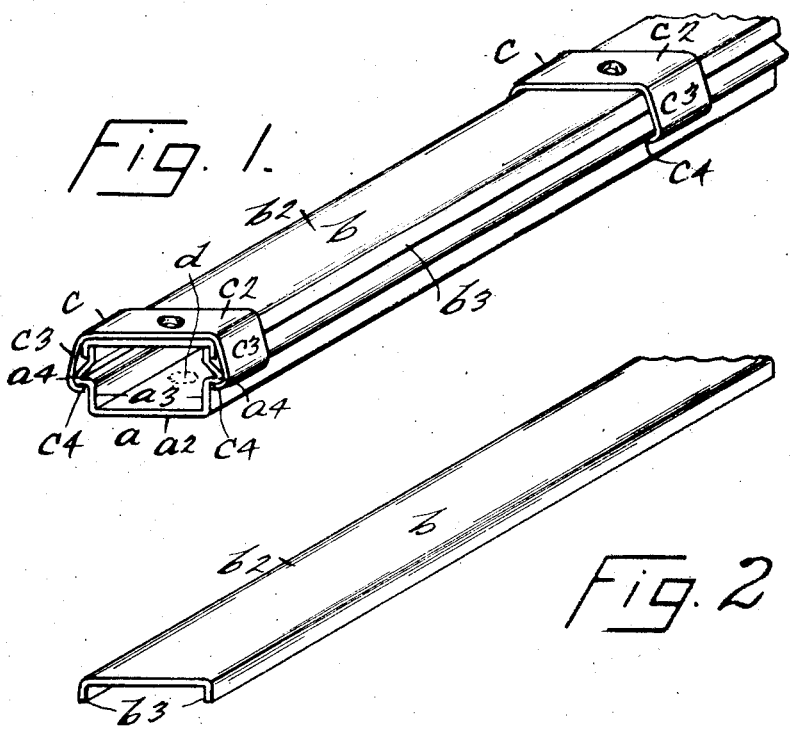
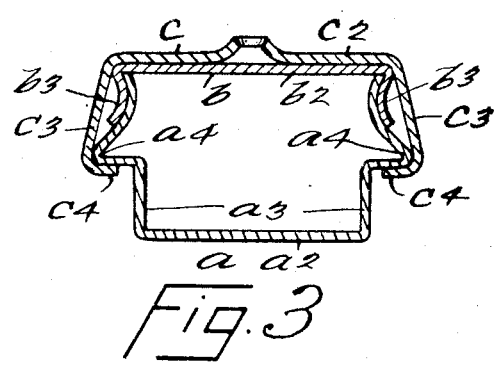
Witnesses:
Inventor
Clifford J. Alpaugh
By Attorney

UNITED STATES PATENT OFFICE.

CLIFFORD JAMES ALPAUGH, OF TRENTON, NEW JERSEY, ASSIGNOR TO THE TRENTON ELECTRIC AND CONDUIT COMPANY, OF TRENTON, NEW JERSEY, A CORPORATION OF NEW JERSEY.

CONDUIT.

1,094,109.  Specification of Letters Patent.  Patented Apr. 21, 1914.

Application filed July 29, 1913. Serial No. 781,866.

*To all whom it may concern:*

Be it known that I, CLIFFORD J. ALPAUGH, a citizen of the United States of America, and residing at Trenton, in the county of Mercer and State of New Jersey, have invented certain new and useful Improvements in Conduits, of which the following is a specification, such as will enable those skilled in the art to which it appertains to make and use the same.

My invention relates to conduits for electrical conductors of such formation as to avoid the necessity for "fishing" said conductors therethrough and whereby access to said conductors is possible when desired.

The invention comprises a trough like member having a bottom and flanged side walls, a cover therefor, and a plurality of clips serving the dual purpose of locking the cover to the main member and, when desired, for holding the conduit to a fixed part of a building, said cover being readily detachable although it may be made in such manner as to be tensionally held to the main member.

My invention is fully set forth in the following specification, of which the accompanying drawings form a part, in which the separate parts are designated by the same reference characters in each of the views, and in which:—

Figure 1 is a perspective view of a part of one section of a conduit constructed in accordance with my present invention; Fig. 2 is a view of one element thereof detached; and Fig. 3 is an enlarged sectional view of a modification thereof.

In the drawings forming a part of this application I have shown a conduit comprising a main, trough-like, member $a$ having a bottom $a^2$ and side walls $a^3$, each of which is provided with an outwardly directed flange $a^4$ approximately centrally of the side walls, said flanges being preferably inclined in the direction of the bottom $a^2$ and at right angles to the side walls on their lower sides, for reasons later set forth.

In the form shown in Figs. 1 and 2 I form the portions of the side walls above and below the flanges in line with each other and at right angles to the bottom $a$ and provide a cover $b$ formed of a top $b^2$ and dependent side walls $b^3$ at right angles thereto, said side walls $b^3$ being parallel and adapted to be sprung over the parallel portions of the side walls $a^3$ above the flanges $a^4$ whereby a closed duct is formed.

At $c$ I have shown a plurality of clips formed of a top $c^2$ and dependent side members $c^3$ inwardly turned at $c^4$ parallel to the lower faces of the flanges $a^4$ and beneath which said inwardly turned ends are adapted to bear to lock the member $a$, cover $b$ and clip $c$ together, and the flanges $a^4$ are inclined on their upper faces to permit the said inturned ends of the clips to slide thereover and thus force the same apart sufficiently far to pass over the outer ends of the flanges in the locking together of the parts, said clips being made of spring steel or the like, as will be understood.

As shown in full lines in the drawings the clips are perforated for screws whereby said clips may be separately secured to a wall of a building in the positions of the rafters or other fixed parts, and the conduit proper being afterward sprung thereinto after the conductors have been arranged therein, but the member $a$ may be drilled for screws, as indicated at $d$, and said member be secured directly to the wall of the building first, after which the conductors and cover $b$ are placed in position and then locked by means of the clips, and in this manner of use I prefer not to perforate the clips for screws.

The only difference between the forms shown in Figs. 1 and 3 resides in the fact that I channel the side wall $a^3$ longitudinally of the conduit above the flanges $a^4$ and form the dependent members $b^3$ in a similar manner whereby the main member $a$ and cover $b$ are tensionally held instead of, as in the form already described, frictionally, this frequently being of considerable advantage where the conductors can be arranged in the conduit previous to the installation of the conduit, but either form admits of the initial installation of either the member $a$ or of the clips $c$, and in both forms the clips serve as positive locking means for the member $a$ and cover $b$.

It will be noted that the interior of my conduit is entirely clear of obstructions, shoulders, or the like which might tend to prevent the passage of conductors therethrough or the injury of the insulation of said conductors, this being a highly important feature of conduits and, when the member $a$ is perforated for screws, said perforations are countersunk for the reception of the screw heads in order to maintain this unobstructed conduit interior.

My invention is very simple in construction, and in installation, is readily opened for inspection or repair of the conductors, and is a complete protection therefor in accordance with present electrical requirements and, because of the overlapping sides of the main member and cover, as well as of the clips $c$, no tool can be passed into the conduit to endanger the conductor insulation when the parts are assembled.

Having fully described my invention, what I claim as new, and desire to secure by Letters Patent, is:—

1. A conduit, comprising a main member having an open side and side walls having a flange, each, intermediate the height thereof, said flanges being outwardly inclined on one face and perpendicular to said side walls on the other face, a detachable cover for said open side, and clips adapted to slide over said inclined flange faces to bear against said perpendicular faces to lock said cover to said main member.

2. A conduit, comprising a main member having an open side and side walls outwardly flanged and extending upwardly and downwardly beyond said flanges, a cover for said open side having dependent sides resting against the upward side wall extensions, and clips engaged with said flanges to lock said main member and cover together.

3. A conduit, comprising a main member having an open side and side walls outwardly flanged intermediate the height thereof, a detachable cover for said open side, and a plurality of clips engaging said flanges for locking said main member and cover together, said clips being perforated for screws for securing to the walls of a building.

In testimony that I claim the foregoing as my invention I have signed my name in presence of the subscribing witnesses this 22nd day of July 1913.

CLIFFORD JAMES ALPAUGH.

Witnesses:
HELEN M. MARION,
KATHARINE L. NYMAN.